United States Patent [19]

Wayne

[11] 4,198,554
[45] Apr. 15, 1980

[54] METHOD AND APPARATUS FOR MICROWAVE VULCANIZATION OF EXTRUDED RUBBER PROFILES

[75] Inventor: I. R. Wayne, Stamford, Conn.

[73] Assignee: Cober Electronics, Inc., Stamford, Conn.

[21] Appl. No.: 812,365

[22] Filed: Jul. 1, 1977

[51] Int. Cl.² .............................................. H05B 9/06
[52] U.S. Cl. ...................... 219/10.55 A; 219/10.55 F; 264/26
[58] Field of Search .................. 264/26; 219/10.55 A, 219/10.55 F, 10.55 R

[56] References Cited

U.S. PATENT DOCUMENTS

| | | | |
|---|---|---|---|
| 3,242,304 | 3/1966 | Hickman | 219/10.55 A |
| 3,535,483 | 10/1970 | Puschner | 219/10.55 A |
| 3,715,551 | 2/1973 | Peterson | 219/10.55 A |
| 3,854,024 | 12/1974 | Kaufman, Jr. | 219/10.55 A |
| 3,889,009 | 6/1975 | Lipoma | 219/10.55 A X |
| 3,953,703 | 4/1976 | Hurwitt | 219/10.55 A X |
| 4,045,639 | 8/1977 | Meisel | 219/10.55 A |

FOREIGN PATENT DOCUMENTS 1598340  7/1970  France ............................. 219/10.55 A Primary Examiner—Arthur T. Grimley
Attorney, Agent, or Firm—Bryan & Bollo

[57] ABSTRACT

A method and apparatus for vulcanizing extruded rubber profiles in vulcanizing ovens to eliminate under cure of the rubber profiles in those areas where the extruded rubber profiles contact a support means by arranging at least one microwave emitter below and in close proximity to the support means. The support means having a high dielectric constant to provide a low reluctance path therethrough so that the microwave energy passes through the support means into the rubber profiles to improve curing of the rubber profiles in the areas where they contact the support means.

2 Claims, 3 Drawing Figures

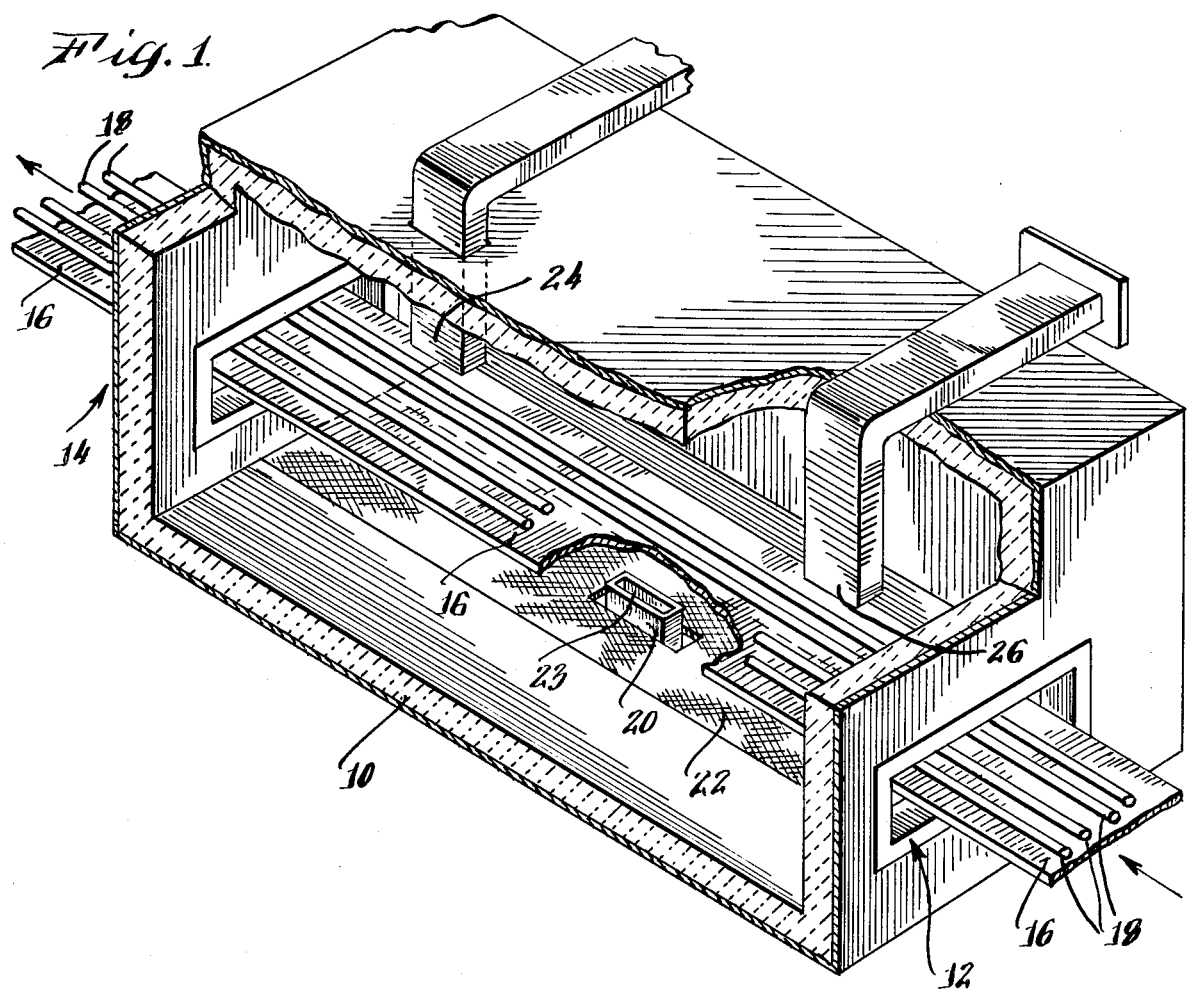
Fig. 1.
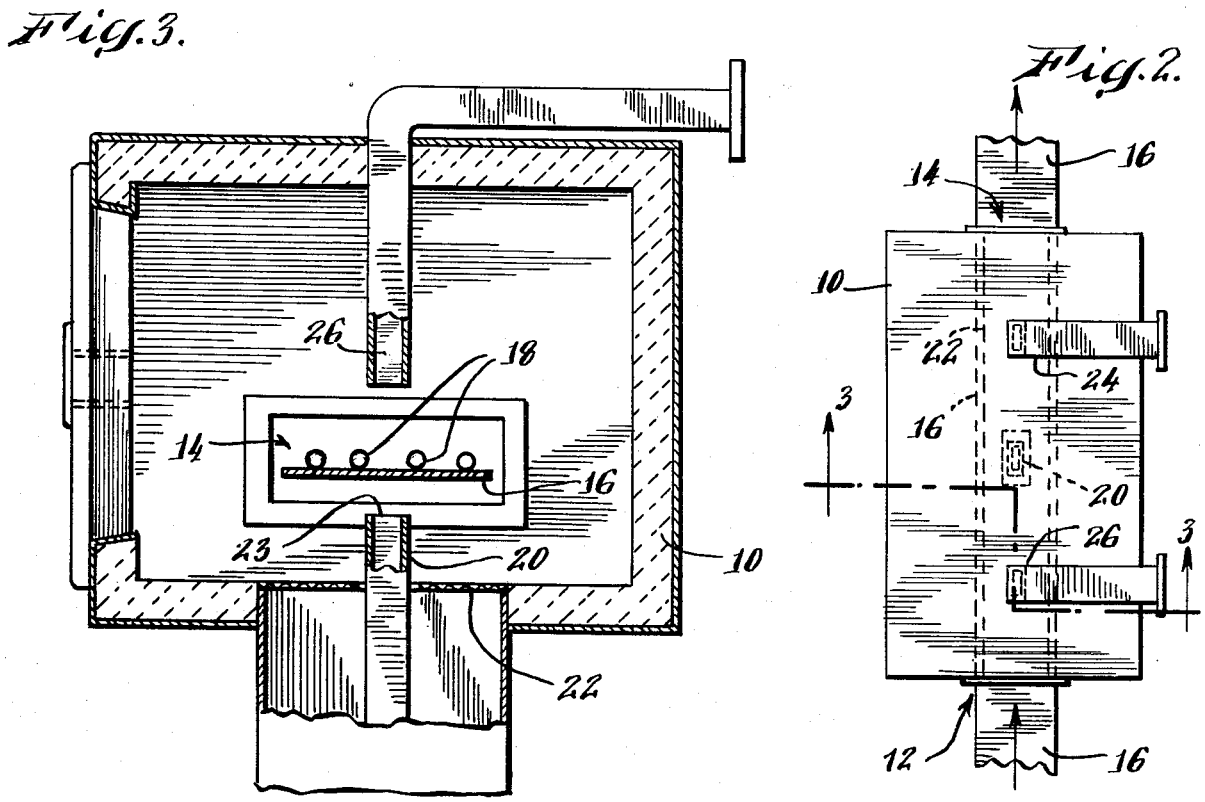
Fig. 3.
Fig. 2.

METHOD AND APPARATUS FOR MICROWAVE VULCANIZATION OF EXTRUDED RUBBER PROFILES

The present invention relates to the rubber vulcanization and more specifically to a method and apparatus for microwave vulcanization of extruded rubber profiles to prevent under curing of such profiles when supported on a platform or conveyor belt. The extruded rubber profiles may include automotive gaskets, automotive weather stripping etc. The rubber may be polar as well as non-polar, although the present invention is particularly useful for non-polar rubbers which are poor receptors of microwave energy.

In known continuous feed vulcanizing ovens, the rubber profiles or products to be cured are placed on a conveyor belt and fed through an oven at a rate to achieve proper cure. The ovens use heat and/or microwave energy to effect the curing. With known arrangements, it is difficult to obtain proper curing at the points where the rubber products contact the conveyor belt. One attempt to solve this under cure problem has resulted in the addition of conveyor pre-heater system, which preheats the conveyor belt. The technique has resulted in some improvement, but has not been entirely satisfactory.

It is an object of the present invention to provide a method and an apparatus for eliminating under cure of rubber profiles in the areas where the rubber profiles contact a non-metallic platform or conveyor means in a vulcanizing oven.

It is a further object of the present invention to provide a method and apparatus for achieving a more complete curing of rubber profiles in a continuous feed vulcanizing oven.

Other objects, aspects and advantages of the present invention will be apparent from the detailed description and the drawings.

Briefly, the apparatus and associated method of the present invention includes a microwave emitter positioned below and in close proximity to a support means having a high dielectric constant for supporting rubber profiles in a microwave oven to achieve more complete curing of the portions of the rubber profiles which are in direct contact with the support means.

The present invention is illustrated in the accompanying drawings in which:

FIG. 1 is a perspective view, with parts broken away, of a continuous feed vulcanizing oven utilizing the present invention;

FIG. 2 is a top plan view of the continuous feed vulcanizing oven of FIG. 1; and FIG. 3 is a sectional view taken along lines 3—3 of FIG. 2.

Referring to FIG. 1, a continuous feed vulcanizing oven embodying the present invention is shown generally at 10. The oven includes an entrance end 12 and an exit end 14. A conveyor belt 16, formed of silicone rubber covered fiber glass is driven through the oven 10 between the entrance end 12 and exit end 14. Preferably, the conveyor belt 16 is made of woven fiber glass impregnated on both sides with silicone rubber. Advantageously, this construction of the conveyor belt 16 provides a high dielectric constant which provides a low reluctance path for the microwave energy and directs the plane and location of the electromagnetic energy from a microwave emitter 20, i.e., concentrates the energy field. The high dielectric constant is in the range of about 5 to about 8. Typically, the conveyor belt 16 has a thickness of 0.025 inches with 0.005 inches being silicone rubber.

The extruded rubber profiles 18 to be cured are conveyed through the oven 10 by the conveyor belt 16. The conveyor belt 16 may be driven by a conventional motor drive unit, as is well known in the art, to convey the rubber profiles 18 serially past the microwave emitter 20. Preferably triple chokes (not shown) are arranged at the entrance end 12 and exit end 14 to inhibit microwave leakage from the oven 10. Further, any door included in the oven 10, see FIG. 3, preferably includes a quarter wave choke to further prevent microwave leakage from the oven 10.

Arranged below the conveyor belt 16 and in close proximity thereto is the microwave emitter 20. Preferably the microwave emitter 20 is arranged from about 4 to about 8 inches below the conveyor belt 16 and directs energy toward the bottom of the conveyor belt 16. Preferably, the emitting end 23 of the microwave emitter 20 is arranged parallel to the conveyor belt 16 in a plane normal to the conveyor belt 16, between at an angle of about 0° to the conveyor belt 16, to an angle of about 45° to the conveyor belt 16. Depending on the thickness and configuration of the rubber profiles, the emitted microwave energy is normally in the range of about 3 to about 24 kilowatts. The microwave energy passes from the emitter 20 through the conveyor belt 16 and into the rubber profile 18 as the rubber profile 18 passes over the emitter 20. The low reluctance path provided by the high dielectric conveyor belt 16 facilitates penetration of the microwave energy through the conveyor belt 16. Preferably, the emitter 20 is arranged within a screen 22 from which hot air, generated in a conventional manner, is emitted toward the conveyor belt 16 to aid in the vulcanization process.

The microwave energy from the emitter 20 is directed into the conveyor belt 16 which concentrates the energy field therein and facilitates transmission of the microwave energy to the rubber profiles 18 at the points where they contact the conveyor belt 16. This results in rapid oscillation of the molecules in the rubber profile, causing heating and curing thereof.

Preferably, in a continuous feed vulcanizing oven for complete curing, microwave emitters are alternately arranged above and below the conveyor belt 16, see FIGS. 1 and 2. In FIGS. 1 and 2, emitter 24, 20 and 26 are shown. Microwave energy is supplied to these emitters by a microwave generator such as Cober Model S6F, available from Cober Electronics, Inc., Stamford, Conn.

In a continuous feed vulcanizing oven having four microwave emitters alternately arranged above and below a conveyor belt, which is driven at 75 feet per minute, microwave energy of 6 kilowatts is emitted from each emitter to increase the temperature of extruded rubber profiles, approximately 1½ inches wide and ¾ inches high, by 200° F. That is, the temperature of the extruded rubber profiles which may be approximately 200° F. after coming from the extruder, is raised to approximately 400° F. before exiting from the oven. Concurrently, with the microwave emissions, hot air at approximately 450° F. is directed upward toward the conveyor belt from the hot air source.

In conjunction with the curing energy from the microwave emitters, the use of conventional forced hot air heat is advantageous. It has proved to be most beneficial if directed upward from directly below the conveyor belt 16. Advantageously, the hot air source surrounds the microwave emitter 20.

It should be understood by those skilled in the art that various modifications may be made in the present invention without departing from spirit and scope thereof as described in the specification and defined in the appended claims.

What is claimed is:

1. A vulcanizing oven of the type having entrance and exit ends with a conveyor belt driven between the entrance and exit ends for conveying extruded rubber profiles to be vulcanized through the oven, the improvement comprising:

at least one microwave emitter positioned below the conveyor belt and in close proximity thereto for transmitting microwave energy toward the conveyor belt and preferentially concentrating the microwave energy at the interface of the rubber profiles with the conveyor belt, the conveyor belt having a dielectric constant of betwen about 5 to about 8 to provide a low reluctance path through the conveyor belt for the microwave energy to facilitate transmission of the microwave energy through the conveyor belt and into the rubber profiles to provide improved curing of the rubber profiles at the interface of the rubber profiles with the conveyor belt.

2. A vulcanizing oven as claimed in claim 1, including:

hot air directing means in the oven for directing hot air toward the conveyor belt.

* * * * *